United States Patent

[11] 3,614,568

[72] Inventors Izrail Mordukhovich Pesis
ulitsa Metallistov, 10, kv. 12;
David Leonidovich Shvarts, ulitsa
Olminskogo, 10, kv. 2, both of Kharkov,
U.S.S.R.
[21] Appl. No. 833,967
[22] Filed June 17, 1969
[45] Patented Oct. 19, 1971
[32] Priority July 19, 1971
[33] U.S.S.R.
[31] 1254002

[54] VOLTAGE STABILIZING DEVICE FOR ELECTRIC DRILL MOTOR
4 Claims, 2 Drawing Figs.
[52] U.S. Cl. .................................................. 318/344,
318/348, 323/20
[51] Int. Cl. ...................................................... H02p 5/18
[50] Field of Search ............................................. 318/342,
344, 347, 348; 322/25; 321/18, 24, 25; 323/7, 9,
79, 80, 20

[56] References Cited
UNITED STATES PATENTS
2,981,882 4/1961 Rosenblatt .................... 322/25 X
3,077,556 2/1963 Graf ............................. 318/347 X Primary Examiner—Oris L. Rader
Assistant Examiner—H. Huberfeld
Attorney—Waters, Roditi, Schwartz & Nissen ABSTRACT: A voltage stabilizing device for an electric drill motor used in a well comprises a voltage control unit provided in the motor connected between a power supply source and current leads of the motor; a voltage transducer in the motor incorporating at least two current transformers having primary winding separately connected to two different ones of the current leads; a voltage transformer connected to the two different ones of the current leads, a plurality of resistors, the current transformers having secondary winding shunted by the resistors having resistances proportional to the total resistance to the corresponding current lead and being connected in series to each other, and to the secondary windings of the voltage transformer, the output of the transducer being essentially a geometrical sum of the voltage transformer, the output of the transducer being essentially a geometrical sum of the voltage of the current leads and the voltage drop across the current lead and being proportional to the motor voltage; a comparison unit adapted to compare a reference voltage proportional to the voltage to be stabilized with the outer voltage of the transducer, the output of the comparison unit being connected to the voltage control unit for controlling the operation of that unit.

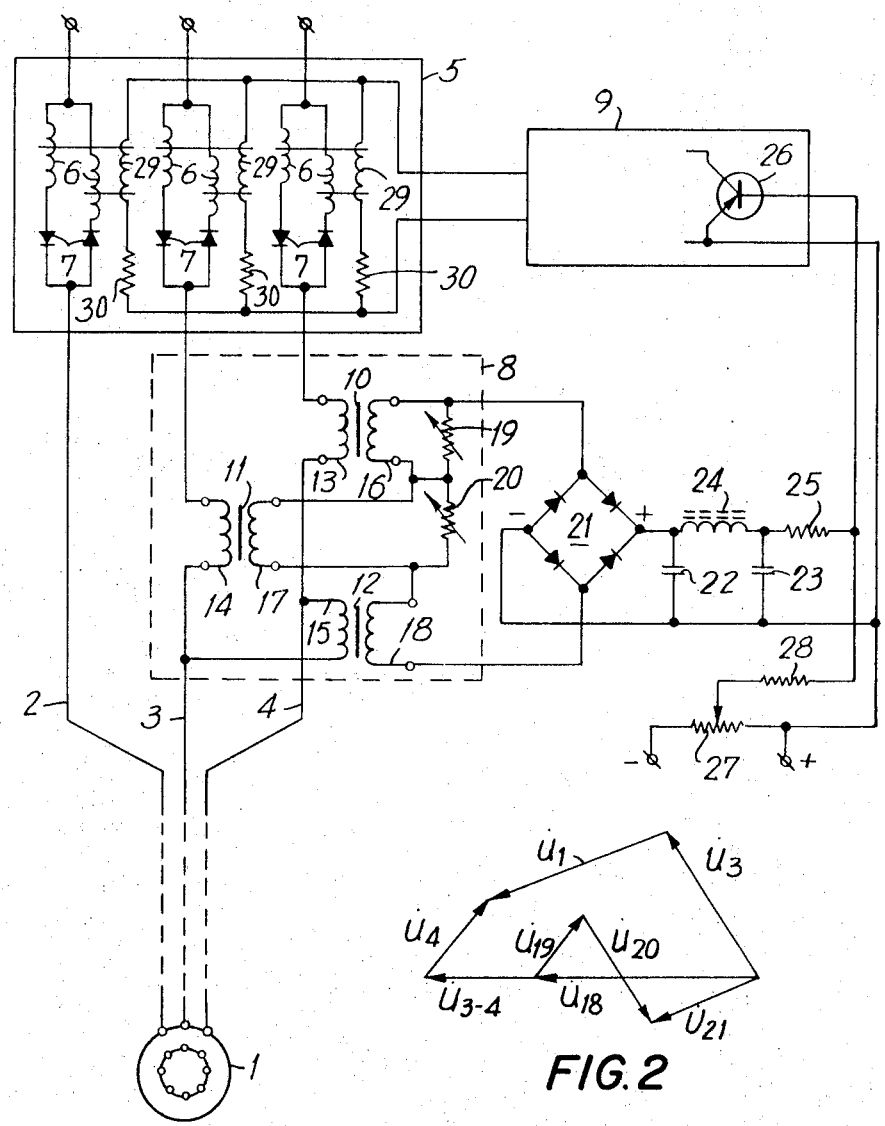

VOLTAGE STABILIZING DEVICE FOR ELECTRIC DRILL MOTOR

The present invention relates to voltage stabilizing devices for an electric drill motor operating in a well at a considerable distance from the power supply source.

Known in the art is that due to a variable load on the electric drill motor the voltage across the terminal thereof varies continuously. To preclude frequent stoppings of the motor with the decrease of the voltage across its terminals it is necessary to diminish the load on the electric drill involved which in turn results in decreased efficiency of drilling.

To diminish the effect of voltage variations use is made of a voltage stabilizing device provided across the terminal of the electric drill motor in question. Such a device incorporates a voltage control unit based upon saturation chokes which is provided beyond the well and is connected to the wires of the current leads between the power supply and the electric drill motor involved. The operation of the above-mentioned voltage control unit is controlled by a feedback system which features a current and voltage transducers within the wires of the current leads and a comparison unit adapted to compare a reference signal corresponding to the voltage to be stabilized and the output voltage of the transducer. The transducer is based on two current transformers interconnected to one of the wires of the current leads, and a voltage transformer connected to two wires of the current leads.

The output signals from each transformer are converted into DC signals which are algebraically summed and compared with the reference signal in the comparison unit adapted to control the voltage regulation unit.

The voltage drop across the chokes varies depending upon the output signal from the comparison unit and thus the voltage across the motor terminals is controlled.

Since in the process of operation of the electric drill there always exists a phase difference between the current and voltage that varies depending upon load involved, the output signal from the comparison unit obtained as a result of comparing the algebraic sum of the transformer output signals and the reference signal, does not correspond to the true voltage variation across the motor terminals. Due to the abovesaid the aforementioned device fails to provide the desired accuracy of voltage stabilization.

The accuracy of voltage stabilization may be improved due to the introduction of a special nonlinear element which would be capable of taking the account of the phase difference between the current and voltage involved.

However implementation of such element is complicated and besides, its utilization complicates the design of the entire stabilizing device and provides great difficulties in service when motors with different performance are involved.

It is the main object of the present invention to improve the accuracy of the operation of the voltage stabilizing device across the terminals of the electric drill motor, that can be employed in the operation of various electric motors irrespective of their performances.

This and other objects of the invention are accomplished by the fact that in the device for voltage stabilization across the terminals of the electric drill motor, comprising a voltage control unit connected to the wires of the current leads between the power supply source and the motor and controlled by the feedback system whose output is essentially a comparison unit adapted to compare the reference voltage proportional to the voltage to be stabilized, and the output voltage from the stabilize voltage transducer featuring at least two current transformers and a voltage transformer, according to the invention, the primary windings of the current transformer are connected to two different wires of the current leads that likewise connect the primary windings of the voltage transformer while connected to the comparison unit are both the secondary windings of the voltage transformer and the secondary windings of the current transformers connected in series to said secondary windings of the voltage transformer and shunted by the resistors whose resistances are proportional to the total resistance of the wires of the current leads. It is reasonable that the proportionality factor be selected equal to the product of the transformation ratios of the current and voltage transformers.

The advantage of the contemplated device lies in the fact that the transducer thereof based on resistors adapted to shunt the secondary windings of the current transformers provides voltages which practically coincide with the phase of voltage drops across the wires of the current leads. Taking into account that the voltage transformer features practically inconsiderable phase error and series connection of the secondary windings of the voltage and current transformers shunted by the resistors provides the obtaining of a geometrical sum of voltages, the voltage at the output of the feedback transducer is exactly proportional to that across the motor terminals. This fact provides high accuracy of voltage stabilization. The invention will be described hereinbelow by way of illustration of an exemplary embodiment thereof with due reference to the accompanying drawings wherein:

FIG. 1 represents an elementary diagram of the voltage stabilizing device, according to the invention, and FIG. 2 represents a voltage vector diagram explaining operation of the voltage transducer at the electric drill terminals.

A sinkable electric motor 1 (FIG. 1) of the electric drill (not shown in the drawing) by wires 2, 3 and 4 of the current leads is connected to the power supply source through a voltage control unit 5. The voltage control unit 5 includes power chokes 6 with diodes 7 exhibiting an inherent positive feedback. The above-mentioned chokes are adapted to compensate for a voltage variation in the electric motor 1 in the process of its operation within the well that may occur both due to current or voltage variation of the power supply source and due to the change of the load on the electric motor 1. The control of the operation of the unit 5 is effected by the feedback system incorporating a voltage transducer 8 provided in the electric motor 1 and a comparison unit 9 adapted to compare the reference voltage proportional to the preset voltage of the electric motor, with the output voltage of the transducer 8 which is proportional to the true voltage across the terminals of the electric motor 1. The unit 9 includes semiconductor components and serves in addition as an amplifier.

The transducer 8 comprises two current transformers 10 and 11 and a voltage transformer 12. A primary winding 13 of the transformer 10 is connected to the wire 4, whereas the primary winding 14 of the transformer 11 is connected to the wire 3. The primary winding 15 of the voltage transformer 12 is connected to the wires 3 and 4. The secondary windings 16, 17 and 18 of the above-mentioned transformers with due account of the polarity are interconnected in series. In this case the secondary windings 16 and 17 of the current transformers are shunted by resistors 19 and 20.

The value of the resistance of the resistors 19 and 20 are selected depending upon the total resistance of the corresponding wire of the current leads so as to provide a voltage at the transducer output which is proportional and coinciding with respect to phase to the voltage available across the terminal of the electric drill in question.

The voltage $U_{19}$ across the resistor 19 is calculated from the following formulas below:

$$U_{19} = i_{19} R_{19} = \frac{i_4}{K_{10}} \cdot R_{19},$$

where $i_{19}$ is the current flowing through the resistor 19 featuring the resistance $R_{19}$;

$i_4$ is the current flowing through the wire 4, and $K_{10}$ is the transformation ratio of the current transformer 10.

The voltage $U_{18}$ at the secondary winding 18 of the transformer 12 is calculated from the following formulas below:

$$U_{18} = \frac{U_{3-4}}{K_{12}},$$

where $U_{3-4}$ is the voltage across the wires 3 and 4 of the current leads, and $K_{12}$ is the transformation ratio of the transformer 12. To provide the hereinabove stated conditions which ensure geometrical summing up of the voltages across the wires of the current leads and the voltage drop across said wires, it is required that $$\frac{\Delta U_4}{U_{19}} = \frac{Z_4 i_4}{U_{19}} = K_{12}$$

where $U_4$ is the voltage drop across the wire 4, and $Z_4$ is the total resistance of the wire 4. Comparing the (1) and (3) we obtain $$R_{19} = Z_4 \frac{K_{10}}{K_{12}}$$

The value of the resistance $R_{20}$ is calculated analogously $$R_{20} = Z_3 \frac{K_{11}}{K_{12}}$$

where $K_{11}$ is the transformation ratio of the current transformer 11. Thus, the resistance of the shunting resistors is approximately equal to the product of the total resistance of the corresponding wire of the currents leads on the transformation ratios between the corresponding current and voltage transformers.

Since the device in contemplation may be utilized in operation with the employment of various current leads, featuring naturally different total resistances the resistors 19 and 20 are variable.

The electric circuit formed by the series-connected secondary windings of the transformers, is connected to the rectifying bridge 21 incorporating two capacitors 22 and 23, and a choke 24. The output of the rectifying bridge 21 through the resistor 25 is connected to the comparison unit 9 which includes a semiconductor transistor 26, the positive pole of the bridge being connected to the base, whereas the negative pole is connected to the emitter.

The power supply source of the reference voltage proportional to the preset voltage to be stabilized in the electric motor 1, is connected to the comparison unit 9 through the adjustably potentiometer 27 and the resistor 28. In this case the positive pole of the reference voltage supply source is connected to the emitter and the negative pole is connected to the base of the transistor 26.

The switching polarity of the rectifying bridge and the reference voltage supply source may be reversed but in any case the emitter and the base should be connected to the poles of the bridge and the reference voltage supply source, featuring unlike polarity.

The output of the comparison unit 9 is connected to the control windings 29 through the resistors 30 of the power chokes 6.

Let us consider operation of the contemplated device.

Let us suppose that the voltage $U_1$ across the terminals of the electric motor 1 of the electric drill is equal to the voltage to be stabilized. This voltage is in fact a geometrical sum of the voltages across the wires 3 and 4 nearby the output of the unit 5 and phase voltage drops $U_3$ and $U_4$ across the wires 3 and 4. As referred to FIG. 2 corresponded to said voltages are the vectors $U_1$, $U_{3-4}$, $U_3$ and $U_4$.

Within the transducer 8 across the resistors 19 and 20 whose values are selected according to the above-mentioned formulas there produced the voltages proportional to the phase voltage drops $U_3$ and $U_4$ across the wires of the current leads, the voltage across the resistor 19 coincides in phase with the voltage $U_4$, while the voltage across the resistor 20 is in antiphase with the voltage $U_3$ (without taking account of the current transformer errors). The voltage $U_{19}$ available at the output of the transformer 12 is proportional and coincides in phase (without taking account of the transformer error) with the voltage across the wires 3 and 4. The voltage $U_{21}$ available at the input of the rectifying bridge 21 is essentially a geometrical sum of the voltages $U_{19}$, $U_{20}$ and $U_{18}$. As referred to FIG. 2 corresponded to said voltages are the vectors $U_{19}$, $U_{20}$, $U_{18}$ and $U_{21}$.

It follows that the vectors $U_4$ and $U_{19}$, $U_3$ and $U_{20}$, $U_{3-4}$ and $U_{18}$ are pairwise colinear and their scalar values are proportional and, consequently, the vectors $U_1$ and $U_{21}$ are likewise colinear and their scaler values are proportional. Consequently, the voltage at the input of the rectifying bridge 21 is proportional to the voltage across the terminals of the electric motor 1 of the electric drill involved. Corresponded to said voltage is a certain voltage $U_0$.

When the electric drill operates, the voltage variation across the terminals of its electric motor may be due to two reasons which are involved both or occur separately: due to variation of the load on the electric motor 1 and due to voltage variation of the power supply source. Corresponded to said variations are voltage variations $U_3$, $U_4$ and $U_{3-4}$ and proportional variations of the voltages $U_{19}$, $U_{20}$ and $U_{18}$. Since it has been already shown that the vectors $U_1$ and $U_{21}$ are colinear and their scalar values are proportional, we may prove that with variations of the aforementioned voltages the voltage at the input of the rectifying bridge 21 will vary similar to the voltage variation across the terminals of the electric drill motor.

The voltage $U_{21}$ from the output of the rectifying bridge 21 is supplied through the resistor 25 to the input of the comparison unit 9, which is simultaneously supplied through the resistor 28 with the reference voltage $U_0$ which is proportional to the voltage $U_1$ under stabilization. Depending upon the difference between the voltages $U_0$ and $U_{21}$ the comparison unit 9 produces a signal according to which the current flowing through the control windings 29 varies with the resultant voltage drop across the power chokes 6.

According to the variation of the voltage drop across the chokes 6 the values of the voltages $U_3$, $U_4$ and $U_{3-4}$, $U_{18}$, $U_{19}$ and $U_{20}$, and consequently, the voltages $U_1$ and $U_{21}$ across the terminals of the motor and across the rectifier, will start to vary, too; when the voltage becomes equal to the reference voltage $U_0$, the comparison unit 9 will not produce the signal to vary the current through the chokes 29 which means that the voltage $U_1$ across the motor terminals has reached the preset value subject for stabilization.

The employment of the herein-disclosed invention provides the possibility to substantially increase the accuracy of voltage stabilization and simplify the design of the entire device.

What is claimed is:

1. A voltage stabilizing device for an electric drill motor in operation in a well, supplied by a power supply source and having three current leads comprising: a voltage control unit provided in said motor connected between the power supply source and the current leads of said motor; a voltage transducer in said motor, incorporating at least two current transformers having primary windings separately connected to two different ones of the current leads; a voltage transformer connected to said two different ones of said current leads, a plurality of resistors, said current transformers having secondary windings shunted by said resistors having resistances proportional to the total resistance of the corresponding current lead and being connected in series to each other and to the secondary windings of the voltage transformer, the output of the transducer being essentially a geometrical sum of the voltages across the current leads and the voltage drop across said current leads being proportional to the motor voltage; a comparison unit adapted to compare a reference voltage proportional to the voltage to be stabilized with the output voltage of said transducer, the output of said comparison unit being connected to the voltage control unit for controlling the operation of said control unit.

2. A device as claimed in Claim 3, wherein the resistance of each of the shunting resistors is where, Z is the total resistance of the wire to which the resistor is connected, $K_i$ stands for the transformation ratio of the current transformer, and
$K_u$ is the transformation ratio of the voltage transformer.

3. A device as claimed in claim 1, wherein said plurality of resistors are variable.

4. A device as claimed in claim 1, including a full wave rectifier connected across the output of said transducer, a filter coupled between said transducer and said comparison unit.